United States Patent [19]

Blanchard

[11] Patent Number: 5,658,001
[45] Date of Patent: Aug. 19, 1997

[54] BICYCLE WITH A LONG STROKE SUSPENSION

[76] Inventor: Pierre Blanchard, 57 Lindor, Granby, Québec, Canada, J2G 8C8

[21] Appl. No.: 38,264

[22] Filed: Mar. 29, 1993

[51] Int. Cl.$^6$ .................. B62K 25/04; B62K 25/28
[52] U.S. Cl. .................. 280/276; 280/275; 280/283; 280/284; 474/140
[58] Field of Search .................. 280/275, 276, 280/277, 283, 284, 285, 286; 474/716, 101, 140; 267/219, 257, 292, 122, 153

[56] References Cited

U.S. PATENT DOCUMENTS

| 452,073 | 5/1891 | Huelsen et al. | 280/283 |
| 706,058 | 8/1902 | Horack | 280/284 |
| 4,997,197 | 3/1991 | Shultz | 280/275 |

FOREIGN PATENT DOCUMENTS

| 0008774 | 9/1905 | Denmark | 280/283 |
| 0543424 | 9/1922 | France | 280/283 |
| 1135966 | 5/1957 | France | 280/284 |
| 0148322 | 7/1931 | Germany | 280/275 |
| 8909718 | 10/1989 | WIPO | 280/283 |

Primary Examiner—Karin L. Tyson
Assistant Examiner—Anne Marie Boehler
Attorney, Agent, or Firm—Pierre Lesperance; François Martineau

[57] ABSTRACT

A swing arm is pivoted to the pedal housing of the bicycle frame and extends rearwardly from the seat post. The rear bicycle wheel is carried by the rear end of the swing arm. A follower is guided and is moveable along the seat post for up and down movement. A brace arm interconnects the swing arm rear end and the follower and an elastic tension cord biases the follower towards the pedal housing. The bicycle has also a front suspension. The front wheel carrying fork of the bicycle is telescopic and upward movement of the front wheel causes elongation of an elastic tension cord. A stabilizer system is also provided whereby upward movement of the front wheel causes upward movement of the rear wheel and vice and versa. Finally, a damper prevents any up-and-down oscillation of the bicycle frame. This damper includes a collapsible, resilient chamber carried by the bicycle frame and a string attached to the chamber and to the swing arm in the rear suspension and to the lower telescopic fork part in the front suspension. Downward movement of the suspension is slowed down upon string tensioning and consequent collapse of the chamber and air expulsion through a chamber bleed hole.

19 Claims, 10 Drawing Sheets

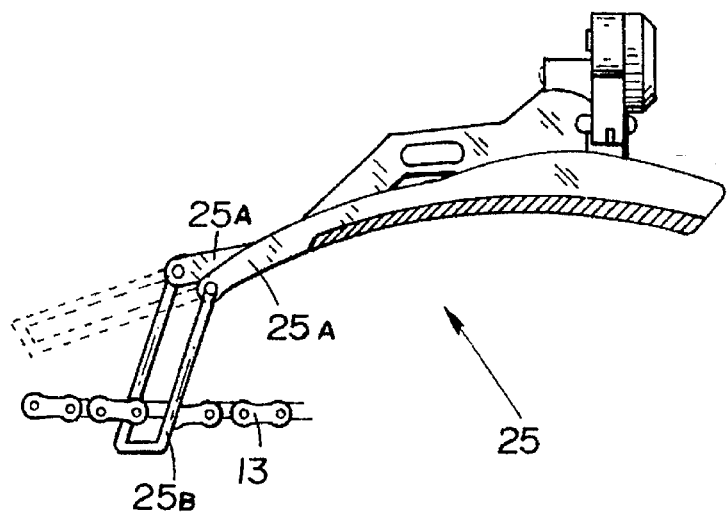
FIG_3.
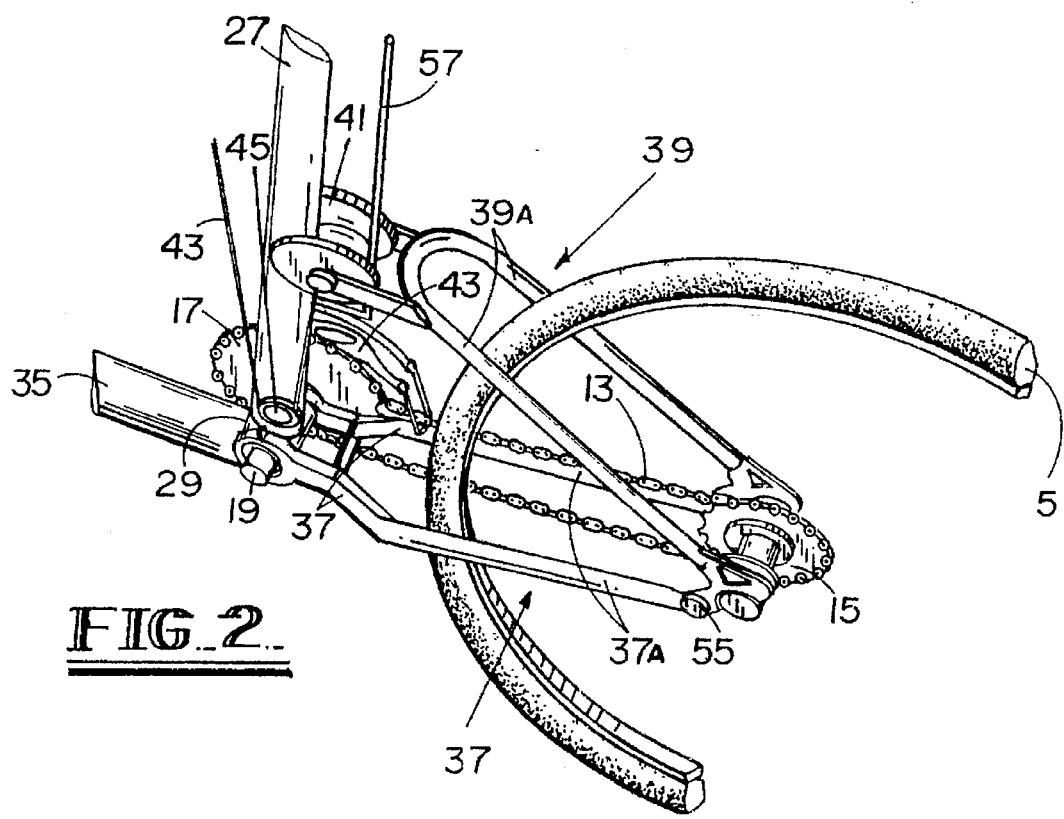
FIG_2.

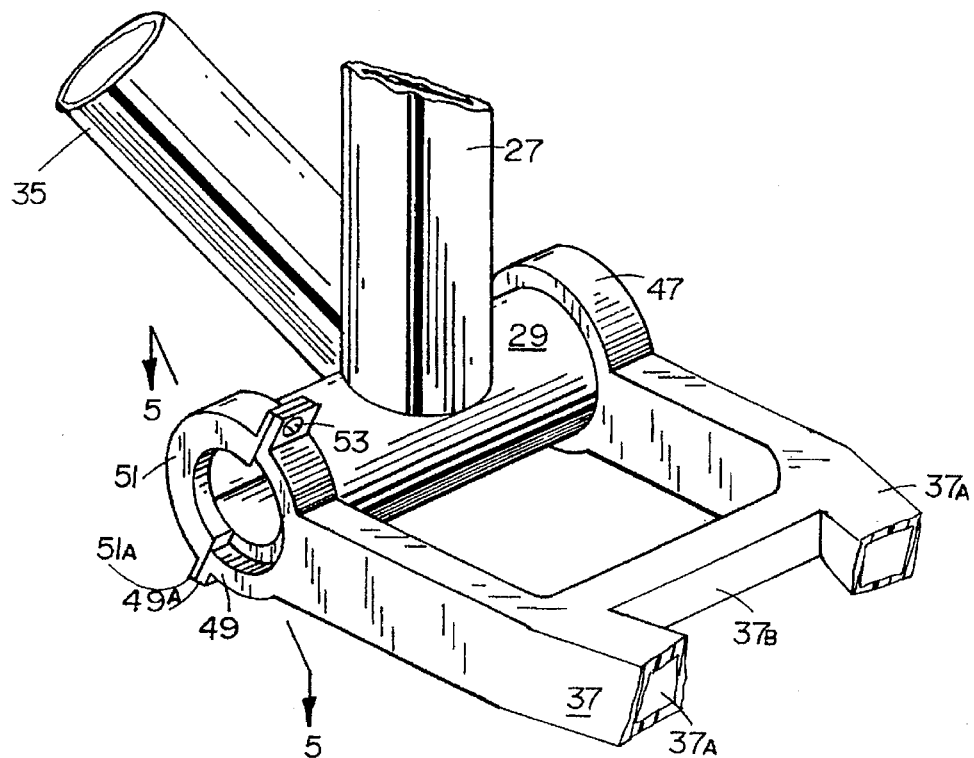
FIG_4
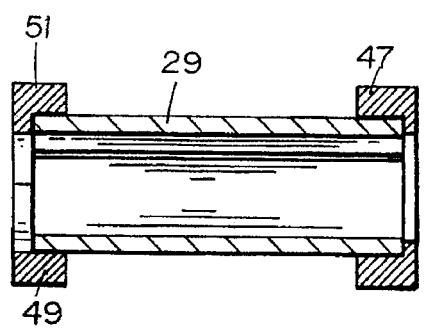
FIG_5

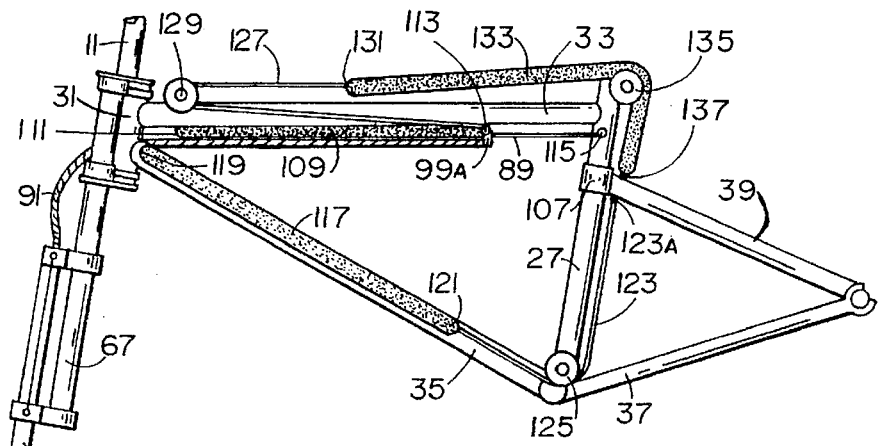
FIG_15.
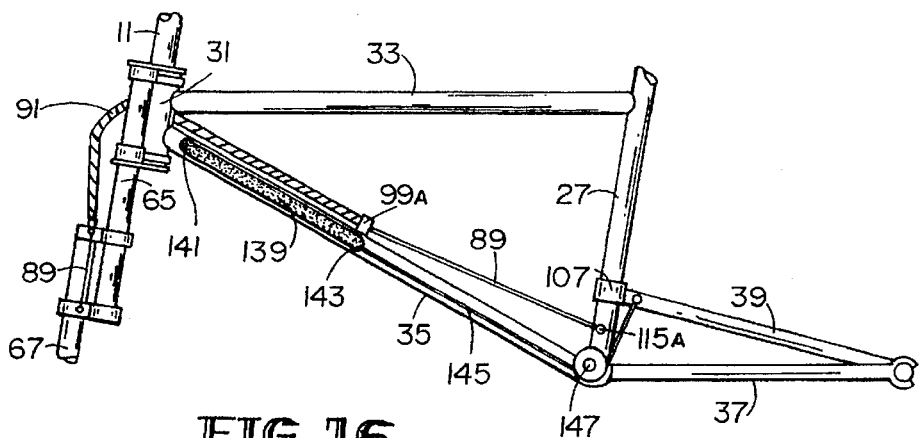
FIG_16.
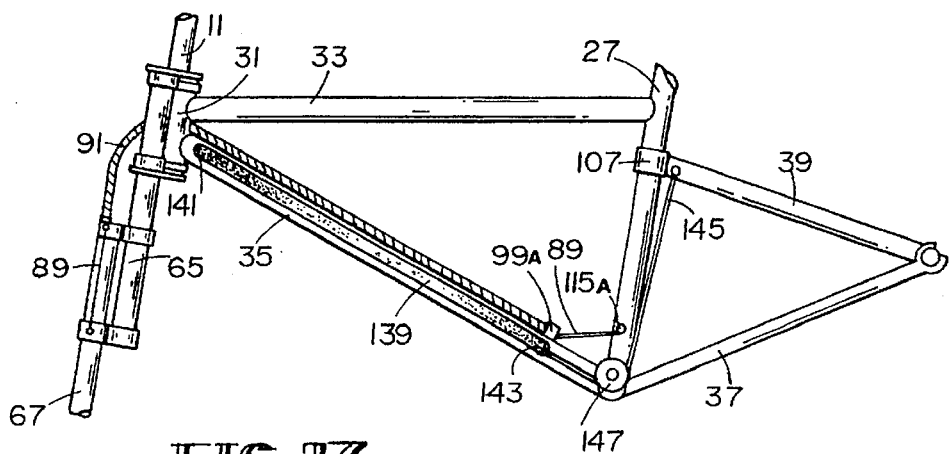
FIG_17.

5,658,001

BICYCLE WITH A LONG STROKE SUSPENSION

FIELD OF THE INVENTION

The present invention relates to bicycles, more particularly to mountain bicycles, equipped with a suspension.

BACKGROUND OF THE INVENTION

In known bicycles equipped with a suspension, the up-and-down movement of the wheels relative to the bicycle frame is limited because the suspension springs used are compression springs. Also, known bicycle suspensions are heavy and this detracts from the aim of building bicycles which are as light as possible.

OBJECTS OF THE INVENTION

It is the main object of the present invention to provide a bicycle equipped with a long stroke suspension and which is very light.

Another object of the present invention is to provide a rear bicycle suspension which includes a rear wheel carrying swing arm provided with a brace arm to prevent torsion of the swing arm.

Another object of the present invention is to provide a long stroke suspension for both the front and back bicycle wheels fitted with a stabilizer system to yieldingly transfer, at least in part, the up-and-down movement of one wheel to the other wheel.

Yet, another object of the invention is to associate the suspension with an oscillation damper.

SUMMARY OF THE INVENTION

The bicycle of the present invention comprises a bicycle frame including rigidly interconnected frame parts, namely a rear frame part consisting of a seat post and of a pedal housing at the lower end of said seat post, a steering rod receiving sleeve at the front of said frame and a tubing interconnecting said seat post and said sleeve; a rear suspension system comprising a swing arm extending rearwardly from and pivoted at its front end to said rear frame part for up and down movement in the plane of said frame, a follower guided by and moveable along said seat post for up and down movement above said swing arm, a brace arm extending above said swing arm, attached to said follower and forming a pivoted junction with the rear end of said swing arm, and biasing means connected between said follower and said bicycle frame and biasing said follower toward said pedal housing, the pivoted junction being adapted to rotatably carry a rear bicycle wheel.

The biasing means is preferably an elastic tension cord. In preferred embodiments, the cord is in the form of a loop disposed along the tubing. One end of the loop is fixed to the tubing near the sleeve while a cable is fixed to the other end of the loop and to the follower, being trained on a pulley attached to the seat post just above the pedal housing.

The follower can be a collar slidable on the seat post but is preferably a grooved wheel rotatably carried by the front end of the brace arm and rotatably engaging the seat post.

The swing arm comprises a pair of laterally spaced arm portions disposed on both sides of the rear bicycle wheel and preferably pivoted to the opened ends of the cylindrical nipple formed by the pedal housing. Preferably, this pivotal connection comprises a stepped, full collar fixed to the front end of one arm portion and rotatably fitted around one end of the nipple with the step of the full collar abutting one end of the nipple and adapted to freely surround the pedal axle, a stepless half-collar fixed to the front end of the other arm portion and rotatably fitted on and axially shiftable along the other end of the nipple, a stepped half-collar rotatably fitted on the other end of the nipple in registry with the stepless half collar and with its step abutting against the other end of the nipple and means to releasably fix the two half collars to each other in registering position.

The front suspension of the bicycle comprises an upper fork part fixed to the steering rod of the bicycle, a lower fork part guided on said upper fork part for up and down movement and adapted to carry the front wheel at its lower end and elastic tension cords attached to both fork parts and biasing said lower fork part downwardly.

Preferably, a stabilizer system is also provided including an additional elastic tension cord to yieldingly transfer at least part of the up and down movement of one wheel to the other wheel.

A damper is also described and claimed to prevent oscillation of the bicycle frame.

BRIEF DESCRIPTION OF THE DRAWINGS

FIG. 2 is a partial prespective view of the rear suspension also showing the front derailleur;

FIG. 3 is a longitudinal section of the front derailleur;

FIG. 4 is a partial perspective view showing the pedal housing and the pivotal connection of the swing arm to said housing;

FIG. 5 is a longitudinal section on line 5—5 of FIG. 4;

FIGS. 14 through 17 are partial side elevations similar to FIGS. 12 and 13, respectively, but showing other embodiments of the front and back suspension and of the stabilizer system;

DETAILED DESCRIPTION OF THE PREFERRED EMBODIMENTS

Figure 1:
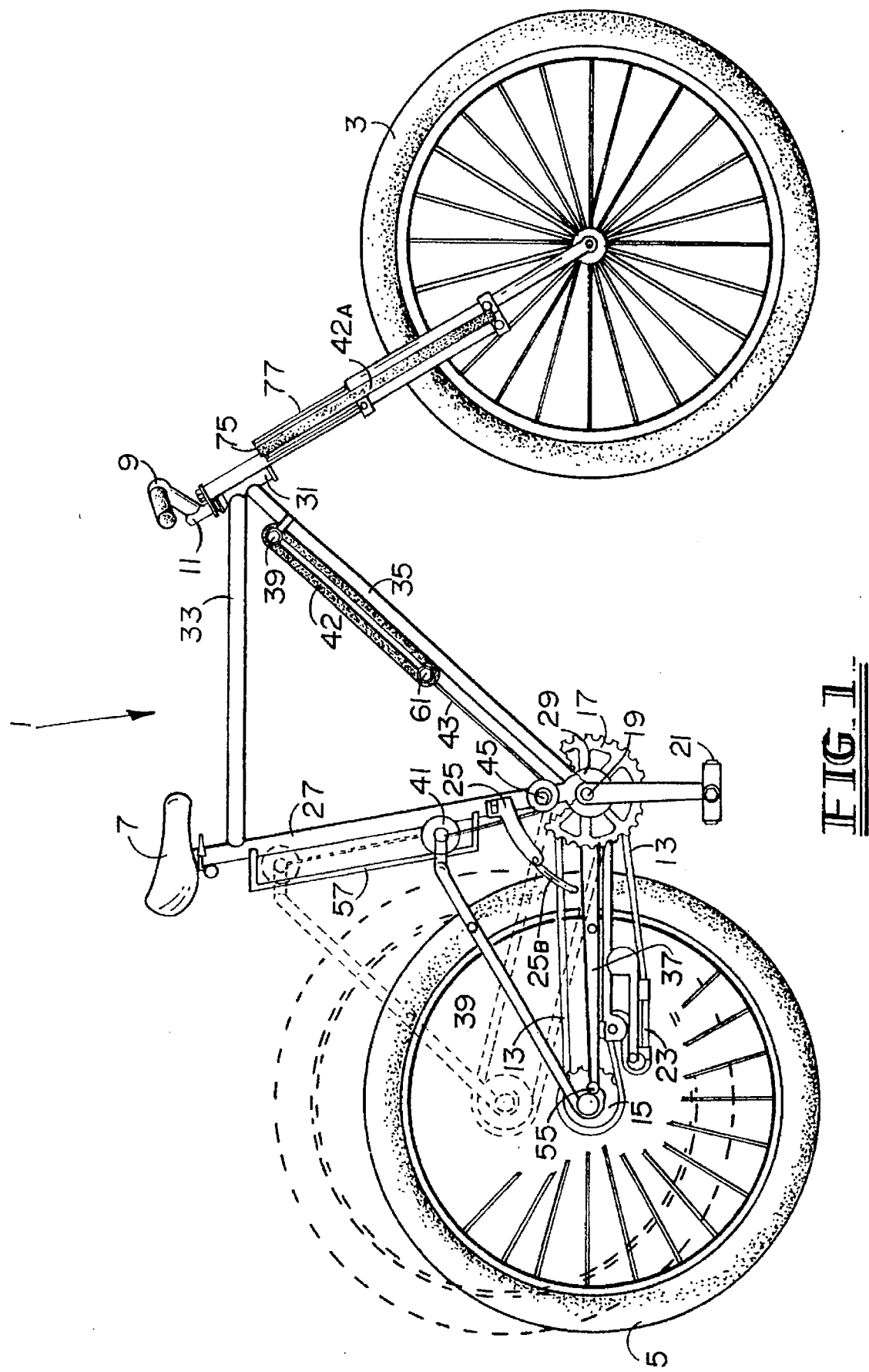
FIG. 1 is a side elevation of a first embodiment of a multi-speed bicycle equipped with a front and a back suspension.

Referring to FIGS. 1 to 9, there is shown a multi-speed bicycle embodying the long stroke suspension of the invention. The bicycle comprises a rigid frame 1, front and back wheels 3 and 5, a seat 7, a handle-bar 9 fixed to a steering rod 11, a gear chain 13, a set of rear gears 15 fixed to the rear wheel shaft, a set of front gears 17 fixed to the shaft 19 of pedals 21, a rear gear derailleur 23 such as applicant's derailleur of U.S. patent application Ser. No. 07/733,624 filed Jul. 22, 1991 now U.S. Pat. No. 5,213,549 and entitled "DERAILLEURS FOR MULTI-SPEED BICYCLE", and a front gear derailleur 25.

The frame 1 is made of rigidly interconnected tubular frame parts including a seat post 27, a pedal housing 29 at the lower end of seat post 27, a steering rod receiving sleeve 31 and tubings interconnecting the seat post 27 to sleeve 31, namely top horizontal tubing 33 and lower forwardly upwardly inclined rubing 35 having its lower end fixed directly to pedal housing 29. Top tubing 33 could be replaced by an inclined tubing parallel to tubing 35 or could be entirely eliminated.

The rear suspension of the invention includes swing arm 37 pivoted to pedal housing 29 and extending rearwardly from the latter, a brace arm 39, a follower 41 carried by the front end of brace arm 39 and guided for up and down movement along seat post 27, an elastic tension cord 42, a flxible cable 43 and an idle pulley 45.

Swing arm 37 is composed of two laterally spaced arm portions 37a joined by a cross arm 37b near their pivoted ends which are formed by a stepped, full collar 47 and by a stepless half collar 49, respectively (FIGS. 4 and 5). Stepped collar 47 is axially fitted over one end of the cylindrical nipple formed by pedal housing 29 until said nipple abuts against the step of collar 47; during this operation, stepless half-collar 49 is made to slide on the cylindrical housing 29. Then a stepped half-collar 51 is secured to stepless half collar 49 by bolts 53 joining lateral ears 49a and 51a of half collars 49 and 51 respectively. The steps of full collar 47 and half collar 51 abut the opposite ends of cylindrical housing 29 and prevent lateral shifting of swing arm 37 on housing 29. Full collar 47 and the full collar formed by the joined half collars 49 and 51 slidably rotate on housing 29.

Rear bicycle wheel 5 extends between the two arm portions 37a and also between the two laterally spaced brace arm portions 39a formed by brace arm 39.

The rear wheel shaft is secured to the rear ends of brace arm portions 39a which are, in turn, pivotally connected to the rear ends of swing arm portions 37a at 55.

Follower 41 is a grooved idle wheel carried by the front end of brace arm 39 and receiving seat post 27. A wheel retaining rod 57 is fixed to seat post 27, is parallel thereto and engages the groove of follower wheel 41 diametrically opposite seat post 27. Rod 57 also serves to limit up and down movement of wheel 41.

Tension cord 42 is a loop and is made of natural or synthetic rubber or other elastomers. Cord 42 is disposed along inclined tubing 35 and its front end is attached to said tubing 35 at 59 near sleeve 31. The rear end of cord 42 is attached at 61 to one end of cable 43 which is trained on idle pulley 45 and has its other end attached to brace arm 39 adjacent follower wheel 41. Pulley 45 is carried by seat post 27 just above pedal housing 29. Upward movement of rear wheel 5 and of swing arm 37 to the limit upper position shown in dotted lines in FIG. 1 causes follower wheel to roll up Seat post 27 against the bias of tension cord 42. Cord 42 also presses wheel 41 against seat post 27. Guide rod 57 clears the bottom of the wheel groove but positively retains wheel 41 in engagement with seat post 27 at all times.

Brace arm 39 with follower wheel 41 prevent torsion of swing arm 37 and therefore rear wheel 5 is maintained in the plane of bicycle frame 1. The biasing means of the rear suspension, namely cord 42, idle pulley 45 and cable 43 is lightweight, an important characteristic for a bicycle.

Referring to FIGS. 1 and 3, it is noted that the front derailleur 25 includes a chain guide formed of two interconnected, spaced plates 25a between which gear chain 13 may extend and a U-shaped hoop 25b pivoted to the rear end of plates 25a and surrounding gear chain 13. The resulting chain guide can positively laterally shift gear chain 13 despite and down movement of the latter when the bicycle travels on rough terrain. Hoop 25b, which is above swing arm 37 abuts the latter and swings upwardly upon upward pivoting of swing arm 37.

The front suspension of the bicycle is illustrated in FIGS. 1, 6, 7, 8, and 9 and includes a telescopic fork 59 carrying the front wheel 3 at its lower end and attached to the steering rod 11 at its upper end. The front suspension further includes elastic tension cords 42a biasing the front wheel downwardly away from the steering rod 11.

More specifically, the telescopic fork 59 composed of two parallel laterally spaced tines 63 between which the front wheel 3 extends. Each tine 63 is composed of an upper part 65 and a lower part 67. The two upper parts 65 are rigidly interconnected and secured to the steering rod 11 by means of a pair of vertically spaced connector plates 69 rigidly secured to the steering rod 11 above and below the sleeve 31 and laterally extending on each side of the steering rod, as shown in FIGS. 6 and 7.

Figure 9:
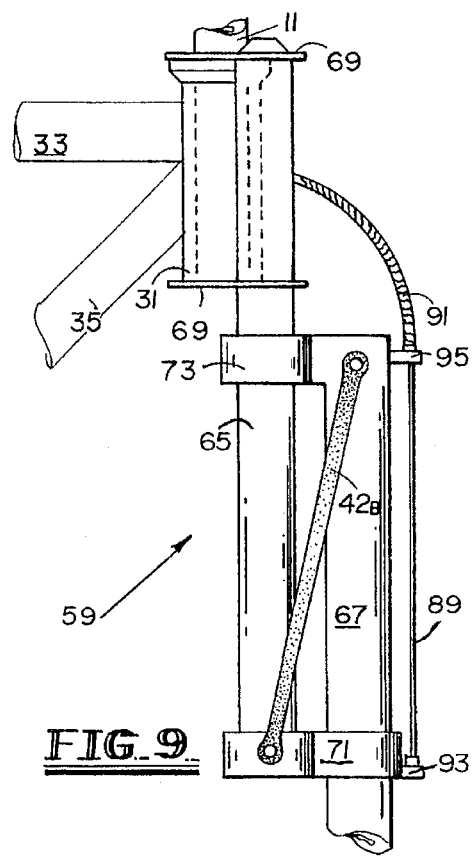
FIGS. 8 and 9 are partial side elevations of the front suspension in down and up portions, respectively.
Figure 8:
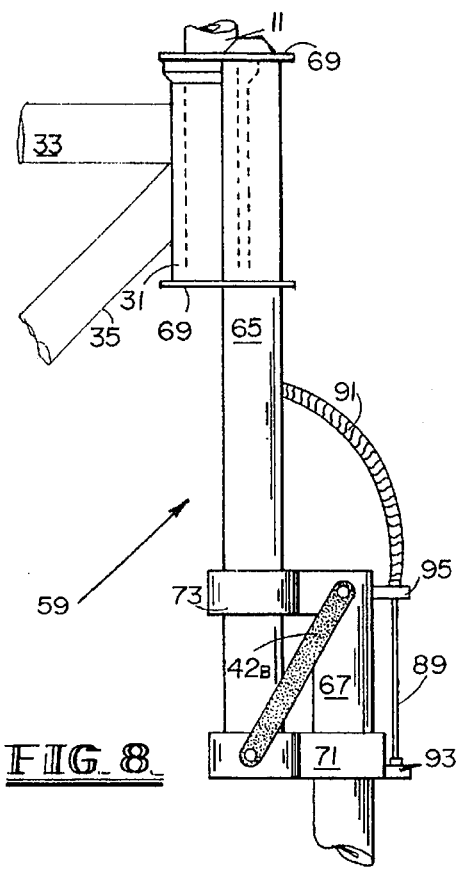

Referring to FIGS. 8 and 9, each tine 63 of the telescopic fork 59 includes a collar 71 rigidly fixed to the lower end of each upper part 65 and which protrudes forwardly therefrom to slidably receive and guide the cylindrical lower part 67. Similarly, an upper collar 73 is fixed to the top end of the lower part 67 and slidably surrounds the cylindrical upper part 65. There are two elastic cords 42b, one for each tine 63; each elastic cord 42b is attached at its ends to the lower end of the upper part 65 and to the upper end of the lower part 67 being arranged laterally outside of the two telescopically slidable parts. The two tension cords 42b exert sufficient tensional forces to maintain the lower part 67 in the down position as shown in FIG. 8 when the bicycle is normally loaded. When the front wheel 3 moves up when encountering a road obstruction, the lower parts 67 can move up to the position shown in FIG. 9 against the bias exerted by the two elastic cords 42b. In practice, the two elastic cords are made longer than shown in FIGS. 8 and 9, being replaced by cords 42a (FIG. 1) having their upper ends attached at 75 to the top of a support 77 protruding upwardly from the top end of the two lower parts 67.

Figure 11:
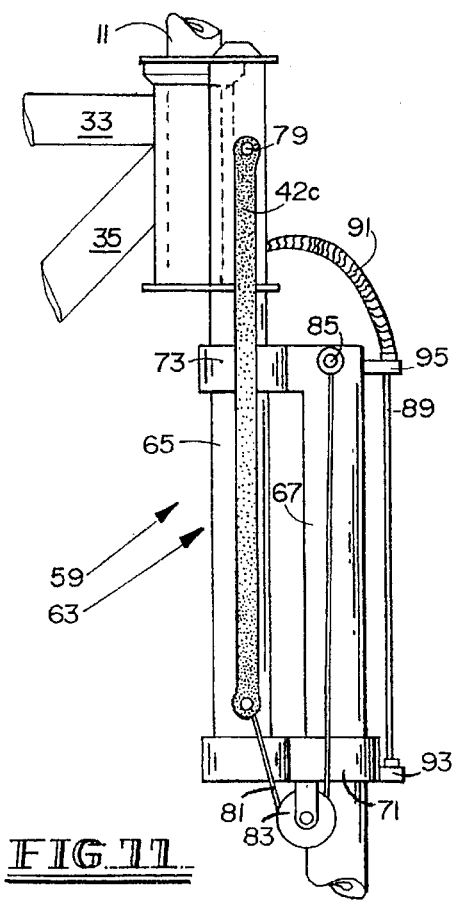
FIGS. 10 and 11 are partial side elevations of another embodiment of the front suspension in down and up positions, respectively.
Figure 10:
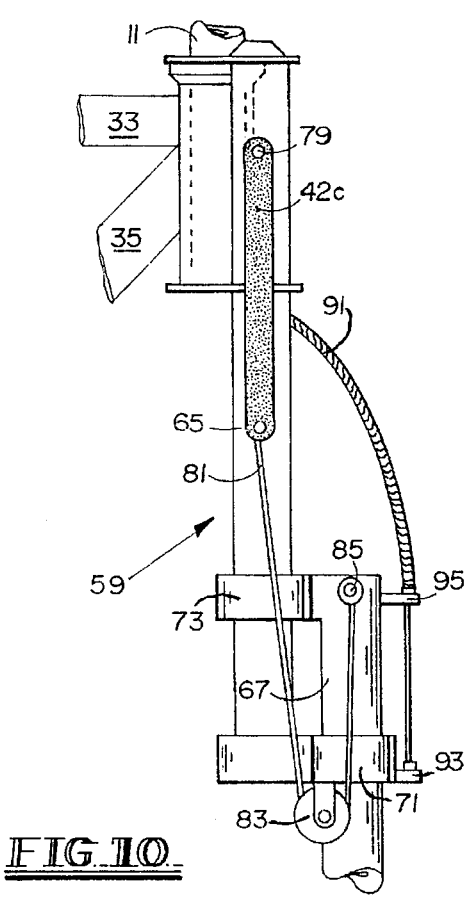

FIGS. 10 and 11 show an alternative arrangement of the elastic tension cords which also enables to use longer cords than those shown in FIGS. 8 and 9. In these Figures, there are two tension cords 42c, one for each tine 63 and each extending alongside the upper part 65. The top end of the tension cord 42c is attached at 79 to the upper part 65 while the lower end of the cord 42c is attached to a cable 81 which is trained on an idle pulley 83 carried by the lower end of the upper part 67 or by the lower collar 71. The cable 81 then extends alongside the lower part 67 and is attached at 85 to the top end of the lower part 67. Upward movement of the lower part causes extension of the elastic cords 42c and, therefore, increases the downward force exerted by said cords.

Figure 6:
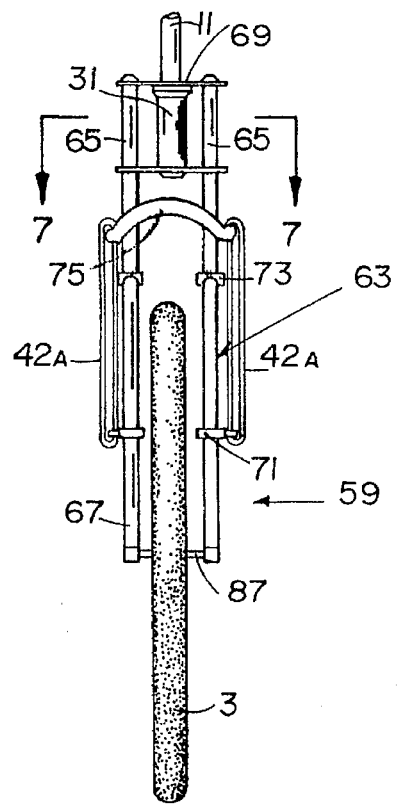
FIG. 6 is a front elevation of part of the bicycle of FIG. 1, and showing the front suspension.
Figure 7:
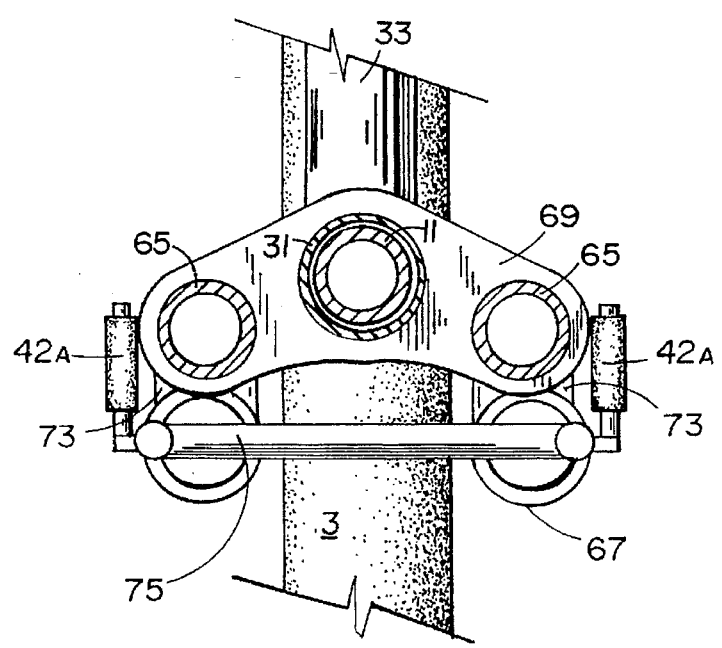
FIG. 7 is a plan section taken along line 7—7 of FIG. 6.

Referring to FIG. 6, it is seen that the shaft 87 of the front bicycle wheel 3 is attached to the lower end of the lower part 67. The telescopic fork 59 is rotated by the handle bar 9 in conventional manner.

Due to the presence of the elastic cords 42a, 42b or 42c which act in tension, the front suspension is of very light construction and also the two collars 71 just scrape away any dirt or mud which may adhere to the external surfaces of the upper parts 65 and lower parts 67.

In FIGS. 8 to 11, there is also shown a flexible cable 89 guided in a cable sheath 91. One end of the cable 89 is attached at 93 to the lower collar 71 carried by the lower end of the upper part 65 while the adjacent end of the cable sheath 91 is attached at 95 to the upper end of the corresponding lower part 67.

In the first and second embodiments of the front suspension illustrated in FIGS. 1, and 6 to 11 inclusive, there is no need for the flexible cable 89 and its associated sheath 91. Such cable and sheath is used in other embodiments to be described hereinafter.

Figure 12:
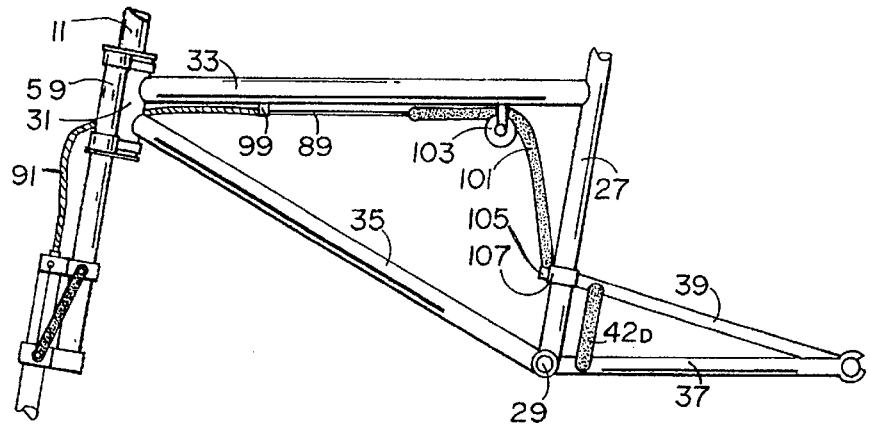
FIGS. 12 and 13 are partial side elevations of the bicycle frame and of another embodiment of the rear suspension in down and up positions, respectively, also showing one embodiment of the stabilizer system, the front suspension being either one of FIGS. 8 or 10.
Figure 13:
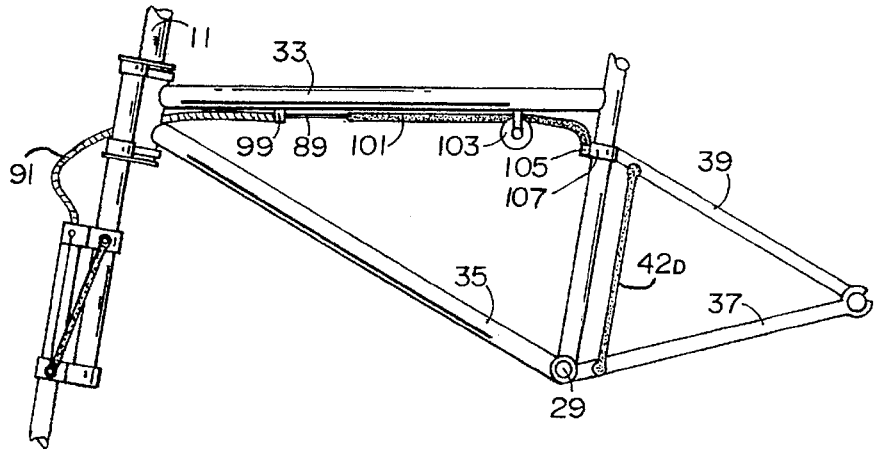

The first such embodiment is illustrated in FIGS. 12 and 13, it incorporates a stabilizer system whereby upward movement of the front wheel tends to raise the rear wheel. In such an embodiment, the rear end 99 of the cable sheath 91 is attached to the top horizontal tubing 33 while the flexible cable 89 has its rear end attached to an elastic tension cord 101 which is trained on an idle pulley 103 while the other end of the cord 101 is attached at 105 to a collar 107 which surrounds and slides up and down the seat post 27. Collar 107 is an alternate, less preferred embodiment of the follower 41 of FIGS. 1 and 2.

In FIG. 12, the elastic cord associated with the rear suspension is also modified as shown at 42d, being an elastic cord attached to the swing arm 37 and to the brace arm 39 adjacent the pedal housing 29 and the collar 107.

A comparison of FIGS. 12 and 13 will show that when the lower fork parts 67 move up, for instance when the front wheel encounters a road obstruction, the cable sheath 91 will take a folded position as shown in FIG. 13 since its rear end 99 is attached to the bicycle frame. This causes front movement of the rear portion of the cable 89 and, therefore, extension of the tension cord 101 which exerts an upward bias on the follower collar 107 against the bias of the tension cord 42d. Therefore the rear suspension, namely the swing arm 37 and brace arm 39, move upwardly and also the rear wheel 5.

It will be understood that the stabilizer system, in accordance with FIGS. 12 and 13, functions only in one direction, that is from front to back of the bicycle, namely raising of the front wheel will cause upward movement of the rear wheel, but upward movement of the rear wheel will not cause corresponding upward movement of the front wheel.

Figure 14:
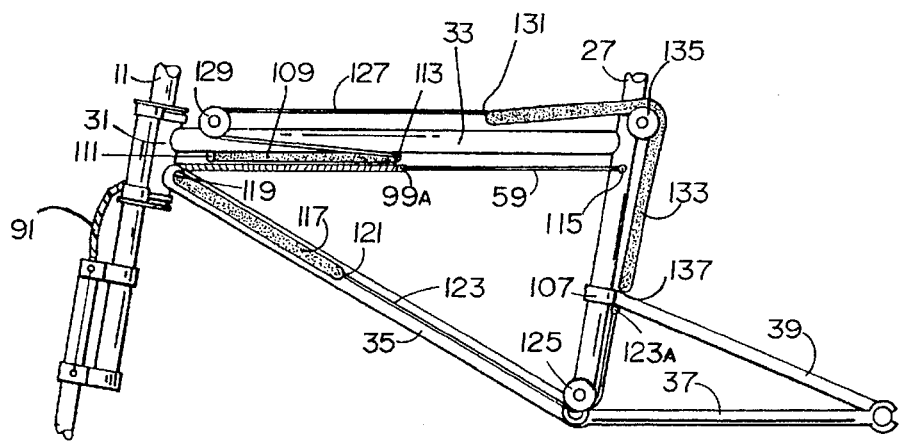

FIGS. 14 and 15 show another embodiment including a stabilizer system and also wherein the elastic cords of the front and rear suspensions have been modified as to their arrangement.

The front suspension elastic cords 42b or 42c of FIGS. 8 to 11 are replaced by an elastic cord 109 which is disposed along the top horizontal tube 15, is fixed thereto at its front end 111 while its rear end 113 is attached to the rear end 99a of cable sheath 91 which is not attached to horizontal tube 33 but is free to slide along the cable 89, the rear end of which is fixed at 115 to the seat post 27. Thus, the elastic cord 109 serves as the downward bias for the front suspension. An elastic cord 117 serves as a downward bias for the rear suspension. Cord 117 extends along the inclined tubing 35 of the bicycle frame 1, its front end 119 being secured to the tubing 35 near the sleeve 31 and its rear end 121 being attached to a flexible cable 123 which is trained on an idle wheel 125 carried by the lower end the seat post 27. The rear end of the cable 123 is attached at 123a to the brace arm 39 adjacent collar 107. Upward movement of collar 107 stretches the tension cord 117. The stabiliser system, per se, includes a flexible cable 127 having one end attached to the rear end 99a of cable sheath 91 and, consequently, to the rear end 113 of the elastic cord 109. Cable 127 is trained on an idle pulley 129 carried by the top horizontal tubing 33 near sleeve 31 and the rear end of the cable 127 is attached at 131 to a stabilizer elastic cord 133 which is trained on an idle pulley 135 carried by the upper portion of the seat post 27 and which is attached to the collar 107 at its lower end 137.

As shown in FIGS. 14 and 15, upward movement of the front wheel 3 causes stretching of the front suspension cord 109 and also stretching of the stabilizer cord 133 which moves collar 107 upwardly along post 27 against the bias of rear suspension cord 117. Therefore, raising of the front wheel will cause upward movement of the rear wheel but upward movement of the rear wheel will not cause corresponding upward movement of the front wheel since cord 133 will simply shorten.

FIGS. 16 and 17 show still another embodiment of a combined front and rear suspension without any stabilizer system. In this case, a single elastic cord 139 serves as a bias for the front and rear suspension. This cord 139 extends along the inclined tubing 35 of the bicycle frame being attached at its front end 141 to tubing 35 adjacent sleeve 31. The rear end 143 of cord 139 is attached to the rear end 99a of cable sheath 91 and also to a rear suspension flexible cable 145 which extends further along tube 35, is trained on an idle pulley 147 and is attached to the collar 107 or to the brace arm 39. Idle pulley 147 is carried by the seat post 27 adjacent the lower end thereof. The cable 89, which extends through the cable sheath 91, is attached to the lower end of the seat post 27 at 115a. Preferably, attachment 115a is at the shaft of idle pulley 147 so that cables 89 and 145 may have parallel portions forwardly of pulley 147.

Figure 18:
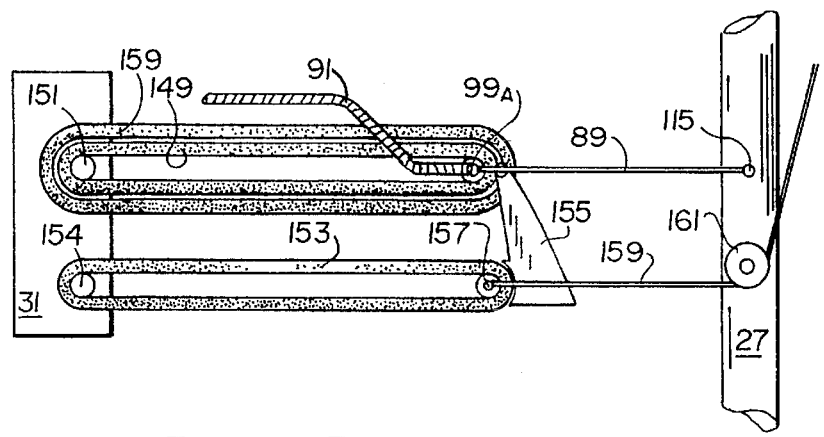
FIGS. 18, 19 and 20 are schematic side elevations of another embodiment of the bicycle suspension with a stabiliser shown in three different positions.
Figure 19:
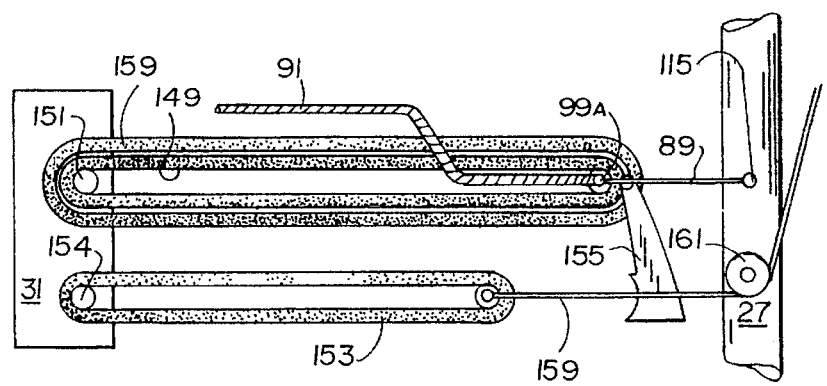
Figure 20:
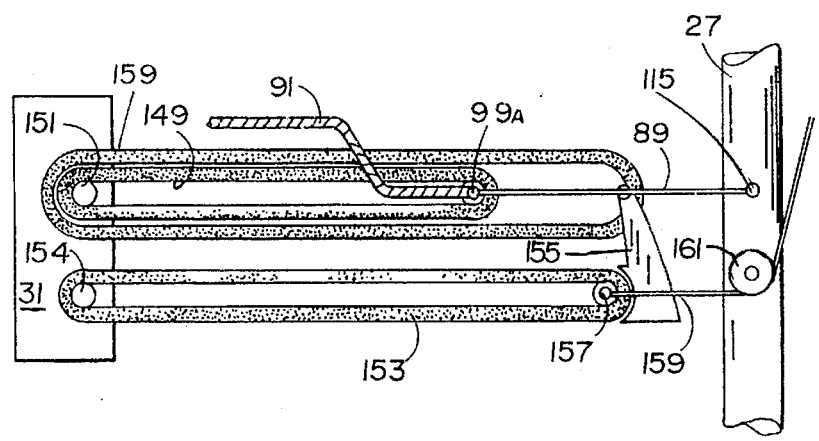

FIGS. 18, 19, and 20 show still another emdobiment incorporating a two-way acting stabilizer system. This embodiment is schematically shown.

The cable sheath 91 together with its associated cable 89 are arranged as in the embodiment of FIG. 14, namely: the front end of cable sheath 91 is attached to the top end of the lower telescopic part 67 while the rear end 99a of cable sheath 91 can move along the cable 89, the front end of which is attached to the lower end of the upper front suspension part 65 and the rear end of which is attached at 115 to the seat post 27.

A front suspension elastic cord 149, in loop form, is attached at this front end at 151 to the sleeve 31 while its rear end is attached to the rear end 99a of the cable sheath 91. It will be understood that upward movement of the front bicycle wheel will cause rearward displacement of the rear end 99a of cable sheath 91 around cable 89 and this will stretch the front suspension cord 149.

The rear suspension is similar to that described in FIG. 14, the rear suspension elastic cord 117 of FIG. 14 is replaced by a loop-shape rear suspension elastic cord 153, one end of which is shown to be attached to the sleeve 31 at 154 and the rear end of which is attached at 157 to a cable 159 trained on an idle pulley 161 carried by seat post 27 and attached at its other end to the collar 107 or brace 39 of the rear suspension system. Here again, it will be seen that upward movement of the rear bicycle wheel, and consequently of the collar 107 along seat post 27 will cause stretching of the rear suspension cord 153.

It is noted that both cables 89 and 159 have a portion adjacent seat 27 and forwardly thereof which are substantially parallel. A slider element 155 is adapted to slides rearwardly and forwardly of the bicycle frame on said two parallel cable portions. The lower end of the slider element 155 is adapted to engage the outside of the rear end of the rear suspension cord 153 to be pushed rearwardly along the rear parallel cable portions upon extension of the rear suspension cord 153. The top end of the slider element 155 is attached at 157 to the rear end of a stabilizer elastic tension cord 159 which has a loop form. The front end of the loop shape cord 159 is attached to sleeve 31 at 151.

FIG. 18 shows a normal position of the arrangement of the three elastic cords and slider element corresponding to normal positions of the front end rear wheels of the bicycle.

A comparison of FIGS. 18 and 19 will show that raising movement of the front bicycle wheel will cause rearward movement of the rear end 99a of cable sheath 91 and consequent extension of both elastic cords 149 and 159. Slider element 155 moves rearwardly along cables 89 and 159 and ceases to exert a forward bias on the rear suspension cord 153. Therefore, the latter is free to extend and the rear bicycle wheel will raise accordingly.

If the rear wheel is first raised (see FIG. 20) then the cable 159 will pull and stretch the rear suspension cord 153 and this will cause rearward movement of the slider element 155 against the bias of only the stabilizer cord 159 which is then stretched. This releases the forward action exerted by stabilizer cord 159 on the front suspension cord 149 and consequently the downward bias exerted on the front wheel by the latter will be decreased and the front wheel will raise. Accordingly, it is seen that the system of FIGS. 18 to 20 acts both ways, namely when the front wheel is raised, the rear wheel will raise accordingly and vice and versa when the rear wheel is raised, the front wheel will raise accordingly.

Figure 21:
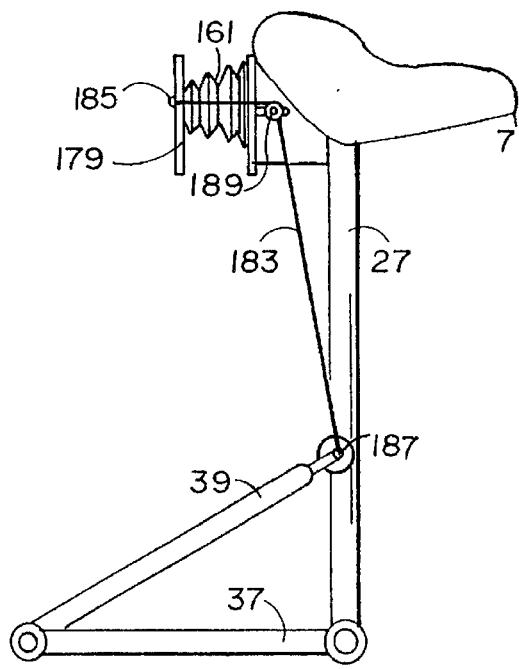
FIGS. 21 and 22 are schematic side elevations of the oscillation damper in two positions of the rear suspension.
Figure 22:
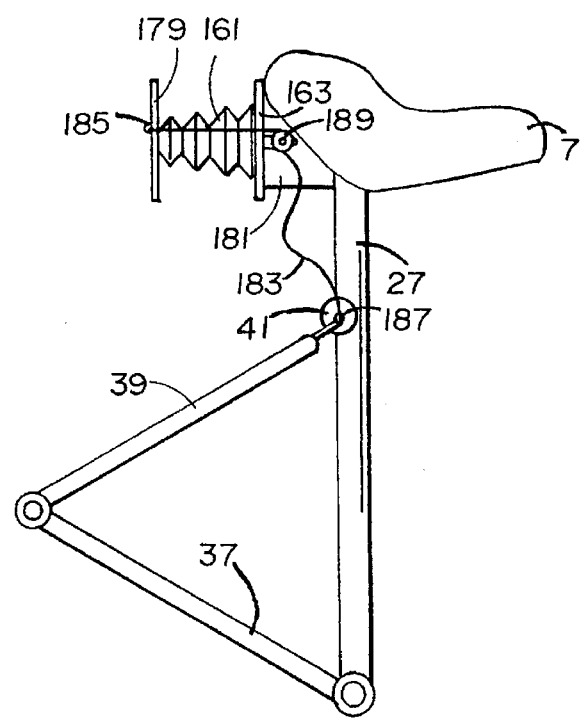
Figure 23:
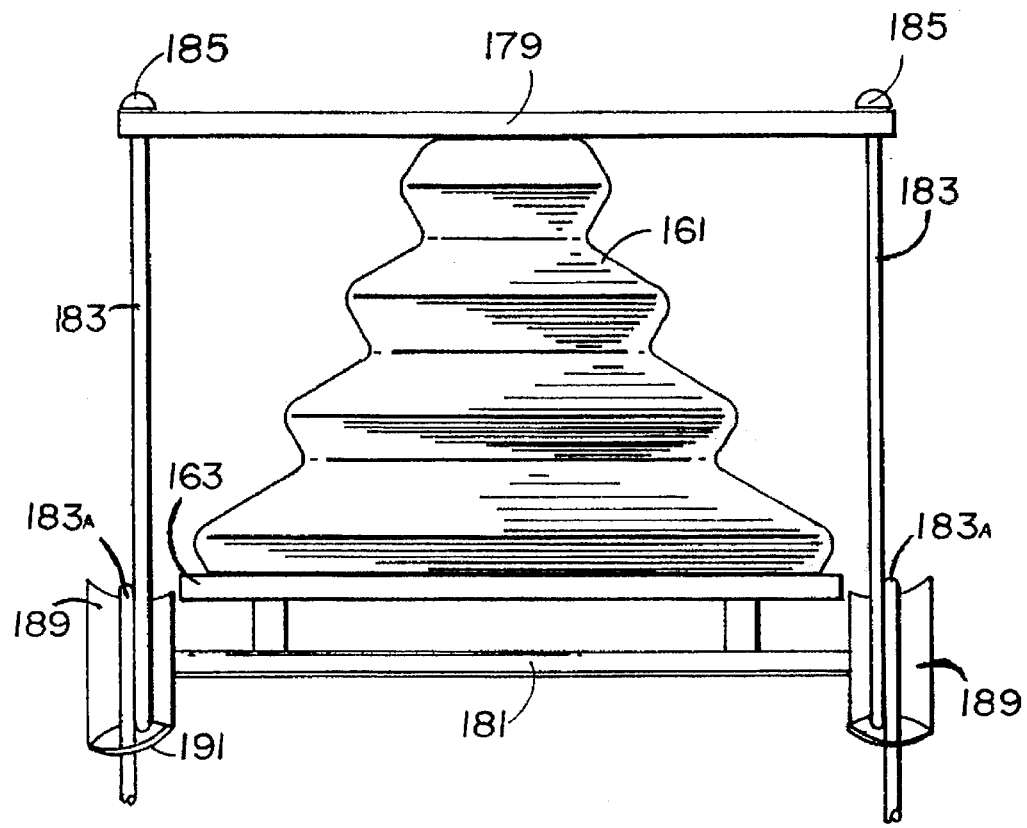
FIGS. 23 and 24 are a side elevation and a section, respectively, of the damper collapsible chamber.
Figure 24:
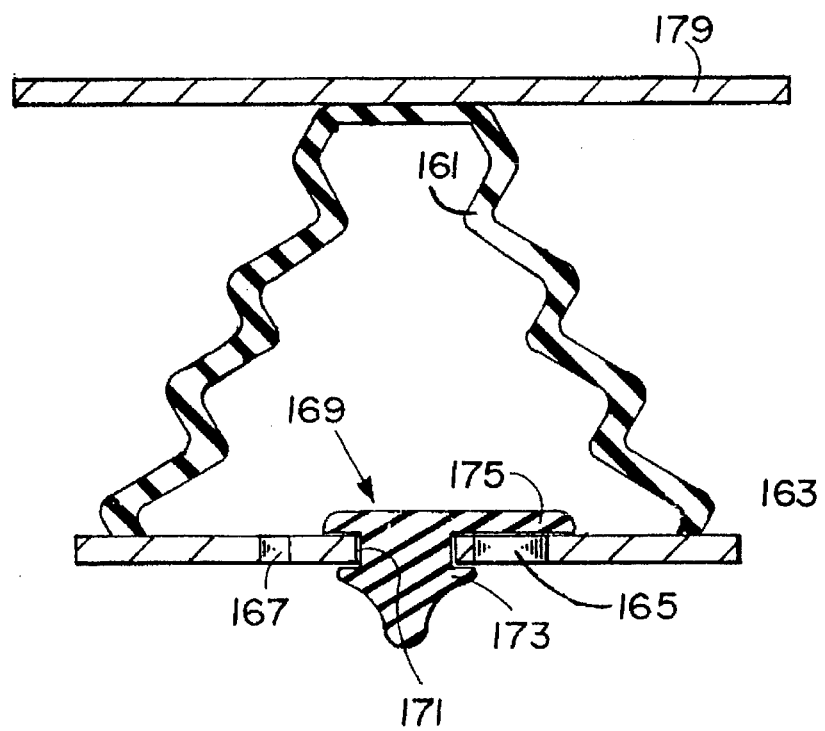

FIGS. 21 to 24 show a damper system for preventing up and down oscillation of the rear bicycle suspension. It is obvious that the same system can be applied to the front bicycle suspension. A resilient collapsible chamber 161 in the form of a bellows made of rubber or other resilient material takes an expanded state as shown in FIGS. 23 and 24 when filled with a fluid, preferably air at atmospheric pressure. The larger base of the bellows is fixed to a plate 163 having an air-filling hole 165 and a much smaller bleed hole 167. The bleed hole 167 is in communication with exterior at all times, while the filling hole 165 is closed by a check valve 169 when the air pressure within the chamber 161 is equal to or greater than the exterior air pressure. More particularly, the check valve 169 is in the form of a rubber element having a body 171 provided with a rim 173 at one end and a resilient flap 175 at the other end. The body 171 is press-fitted within a hole 177 made in base plate 163 and retained in this hole by rim 173 with the flap 175 overlying and closing air filling hole 173. Flap 175 opens upon partial vacuum in chamber 161.

A second plate 179 is attached to the opposite end of the bellows 161. Plate 163 is fixed to a support plate 181 which, as shown in FIGS. 21 and 22, is part of a support fixed to the seat post 27 at the upper end thereof, for instance, just below the bicycle seat 7. Obviously, support plate 181 allows free communication of holes 165, 167 with the exterior. Two strings 183 are attached at one end 185 to second plate 179 on each side of the bellows 161 while the other end of the two strings 183 are attached to the rear suspension follower 41, more particularly, on each side of the follower wheel to the yoke carrying said follower wheel. Each string 183 is wound at least one full turn around a flanged circular stud 189 protruding from each side of the support plate 181, as shown in FIG. 23. A guard 191 secured to each stud 189 extends over the wound string to prevent disengagement of said string from the stud 189. The length of the two strings 183 is adjusted in accordance with the user's desires so that the strings 183 will become taut only in a lower adjusted portion of the down movement of the follower wheel. During this downward movement the strings, upon becoming taut, collapse the chamber 161 but the air will be expelled at a slow rate through the bleed hole 167; therefore downward movement of the follower is smoothly decelerated. The resistance to this downward movement as produced by the collapsing air chamber 161 is increased by the friction developed on the string turns 183a around the rounded studs 189 when the strings 183 are taut. When the strings are loosened, no friction is exerted on the strings by the studs 189 and, therefore, the bellows 161 are free to return to their original expanded position with the exterior air re-filling the bellows, the check valve flap 175 being in open position.

This damper system is efficient to quickly eliminate any up and down oscillation of the suspension; obviously, the same system can be applied to the front suspension.

This shock-absorbing damper system is of very light weight.

Obviously, a damper system can be built in the same manner, but using a liquid such as oil instead of air as the fluid contained in chamber 161. In this case, a reservoir would be provided to receive the expelled fluid and to return the same to the chamber.

The strings 183 can be replaced by any other type of pulling members which act only in tension.

I claim:

1. A bicycle comprising a seat post, a pedal housing at the lower end of said seat poet, a steering rod receiving sleeve, a tubing interconnecting said seat post and said sleeve, said seat post, pedal housing, sleeve and tubing constituting a rigid unitary bicycle frame, a swing arm extending rearwardly and pivoted at its front end to said bicycle frame at said pedal housing for up and down movement in the plane of said bicycle frame, a follower guided by and moveable along said seat post for up and down movement above said swing arm, a brace arm extending above said swing arm, attached to said follower and forming a pivoted junction with the rear end of said swing arm, and biasing means connected between said follower and said bicycle frame and biasing said follower toward said pedal housing, said pivoted junction adapted to rotatably carry a rear bicycle wheel;

further including a bicycle chain and a set of gears of varying diameters carried by said pedal axle and a chain guide mounted on said bicycle frame for gear shifting movement in a direction parallel to said pedal axle and including a pair of interconnected spaced plates between which said bicycle chain may extend, said chain guide being characterized by a U-shape hoop pivoted to the rear ends of said plates for pivotal movement in a vertical plane, said hoop surrounding said bicycle chain.

2. A bicycle as defined in claim 1, wherein said biasing means is an elastic tension cord, said tension cord forming a loop, one end of the loop being fixed to said tubing adjacent said sleeve and further including a cable fixed to the other end of said loop and to said follower and trained on a pulley carried by said seat post above said pedal housing.

3. A bicycle as defined in claim 1, wherein said pedal housing is a cylindrical nipple opened at both ends and adapted to receive a pedal axle protruding from both ends of said nipple, said swing arm comprising a pair of laterally spaced arm portions, each having a front end, a stepped full collar fixed to the front end of one arm portion and rotatably fitted around one end of said nipple with the step of said full collar abutting against the one end of said nipple and adapted to freely surround said pedal axle, a stepless half-collar fixed to the front end of the other arm portion and rotatably fitted on and axially shiftable along the other end of said nipple, a stepped half-collar rotatably fitted on the other end of said nipple in registry with said stepless half collar and with its step abutting against said other end of said nipple and means to releasably fix said half collars to each other in registering position.

4. A bicycle as defined in claim 1, wherein said biasing means is an elastic tension cord disposed along said seat post and extending between and interconnecting said swing arm and said brace arm adjacent said pedal housing and said follower.

5. A bicycle as defined in claim 1, wherein said biasing means is a first elastic tension cord and further including a steering rod rotatably carried by said steering rod receiving sleeve, a telescopic front fork fixed to and downwardly depending from said steering rod and adapted to carry a front bicycle wheel at its lower end, said telescopic fork including an upper part fixed to said steering rod and a lower part guided by and mounted for up and down movement relative to, said upper part and second elastic tension cords connected between said two parts and biasing said lower part downwardly with respect to said upper part.

6. A bicycle as defined in claim 5, wherein said elastic tension cords extend between and are attached to the lower end of said upper part and to the upper end of said lower part.

7. A bicycle frame as defined in claim 5, wherein said elastic tension cords have one end attached to the upper end of said upper part, a flexible cable attached to the other end of said cords, an idle pulley carried by the lower end of said upper paint and on which said cable is trained, the other end of said cable attached to the upper end of said lower fork part.

8. A bicycle as defined in claim 5, further including a cable sheath having one end fixed to the upper end of said lower part and its other end fixed to said tubing, a flexible cable longitudinally movable within said cable sheath and having one end attached to the lower end of said upper part, a third elastic cord having one end attached to the other end of said flexible cable and its other end attached to said follower and an idle pulley carried by said frame adjacent the upper end of said seat post and on which said third elastic cord is trained, said third elastic cord biasing said follower upwardly when said lower part moves upwardly.

9. A bicycle as defined in claim 1, further including a steering rod rotatably received within said steering rod receiving sleeve, an upper fork part fixed to said steering rod, a lower fork part slidably guided on said upper fork part for up and down movement relative to said upper fork part, the lower end of said lower fork part adapted to carry a front bicycle wheel, a flexible cable attached to the lower end of said upper fork part and to said bicycle frame adjacent said pedal housing, a flexible sheath surrounding said cable, attached to the upper end of said lower fork part and having its other end freely moveable on said cable and said biasing means including an elastic tension cord having one end attached to said frame adjacent said sleeve and its other end attached to the free end of said sheath.

10. A bicycle as defined in claim 9, wherein said biasing means include said elastic tension cord and a second flexible cable having one end attached to said brace arm adjacent said follower and its other end attached to the other end of said tension cord and of said sheath and an idle pulley carried by the lower end of said seat post and on which said second cable is trained, whereby said elastic tension cord biases both said front and rear wheels towards a down position with respect to said bicycle frame.

11. A bicycle as defined in claim 1, further including a steering rod rotatably carried by said steering rod receiving sleeve, an upper fork part fixed to said steering rod, a lower fork part guided on and moveable for up and down movement relative to said upper fork part, said lower fork part adapted to receive a front bicycle wheel at its lower end, a cable sheath fixed to the upper end of said lower fork part, a first flexible cable within said sheath having one end fixed to the lower end of said upper fork part, said flexible cable having its other end fixed to said seat post, the other end of said flexible sheath slidable along said cable under up and down movement of said lower fork part, a first elastic tension cord downwardly biasing said lower fork part having one end attached to said bicycle frame adjacent said sleeve and its other end attached to said other end of said cable sheath, said biasing means being a second elastic tension cord downwardly biasing said follower, having one end attached to said bicycle frame adjacent said sleeve, a second flexible cable having one end fixed to the other end of said second elastic tension cord and having its other end attached to said brace arm adjacent said follower, a first idle pulley mounted on said seat post adjacent said pedal housing and on which said second cable is trained, a third elastic tension cord upwardly biasing said follower when said lower fork part moves upwardly, said third elastic cord having one end attached to said brace arm adjacent said follower extending upwardly therefrom, a second idle pulley carried by said seat post adjacent the seat of said bicycle and on which said third elastic cord is trained, a third idle pulley mounted on said bicycle frame adjacent said sleeve, a third flexible cable trained on said third idle pulley and having one end attached to the forward end of said third elastic cord and its other end attached to said other end of said cable sheath.

12. A bicycle as defined in claim 1, further including a steering rod rotatably received within said steering rod receiving sleeve, an upper fork part fixed to said steering rod, a lower fork part slidably guided on said upper fork part for up and down movement relative to said upper fork part, the lower end of said lower fork part adapted to carry a front bicycle wheel, a first flexible cable attached to the lower end of said upper fork part and to said seat post, a flexible sheath surrounding said first cable, attached to the upper end of said lower fork part and having its other end movable on said first cable, a first elastic tension cord having one end attached to said sleeve and its other end attached to said movable end of said sheath, said biasing means including a second elastic tension cord having one end attached to said sleeve, a second flexible cable having one end attached to said brace arm adjacent said follower and its other end attached to the other end of said second tension cord, an idle pulley carried by the lower end of said seat post and on which said second cable is trained, said first and second cables having generally parallel portions adjacent said seat post, a slider slidable on both parallel portions and in the path of said other ends of both said first and second elastic cords, said slider sliding on said parallel portions towards said seat post upon elongation of either one of said first and second elastic cords, and a third elastic cord having one end attached to said sleeve and its other end attached to said slider and biasing said slider towards said sleeve.

13. A bicycle as defined in claim 12, wherein each one of said elastic cords forms a loop.

14. A bicycle as defined in claim 1, further including a rear suspension oscillation damper including a collapsible resilient chamber carried by said bicycle frame and a pulling member attached to said chamber and to said follower, said chamber containing a fluid and having a check valve and a bleed hole, said chamber slowly collapsing while expelling said fluid through said bleed hole upon a pull exerted by said pulling member and produced by the downward movement of said follower relative to said bicycle frame and resiliently expanding while said fluid re-enters said chamber through said check valve upon cessation of said pull during upward movement of said follower.

15. A bicycle as defined in claim 14, wherein said pulling member is a string which is loose when said follower moves through an upper portion of its up and down movement and is taut and collapses said chamber during the lower portion of the down movement of said follower.

16. A bicycle as defined in claim 15, wherein said chamber is a bellows made of resilient material, a first plate fixed to one end of said bellows and to said bicycle frame, a second plate fixed to the other end of said bellows and to which one end of said string is attached and a circular portion carried by said first plate and on which said string is wound at least one complete turn, the friction exerted by said circular portion on said string when said string is under tension adding to the resistance exerted by said chamber collapsing during the down movement of said follower.

17. A bicycle comprising a steering rod rotatably received within a steering rod receiving sleeve, an upper fork part fixed to said steering rod, a lower fork part slidably guided on said upper fork part for up and down movement relative to said upper fork part, the lower end of said lower fork part adapted to carry a front bicycle wheel, a support upstanding from the top of said lower fork part and a pair of loop-shaped elastic tension cords extending on each side and longitudinally of said upper and lower fork parts and connected to the lower end of said upper part and to the upper end of said support and biasing said lower part downwardly with respect to said upper part.

18. A bicycle comprising a steering rod rotatably received with a steering rod receiving sleeve, an upper fork part fixed to said steering rod, a lower fork part slidably guided on said upper fork part for up and down movement relative to said upper fork park, the lower end of said lower fork part adapted to carry a front bicycle wheel, and an elastic tension cord having one end attached to the upper end of said upper part, a flexible cable attached to the other end of said cord, an idle pulley carried by the lower end of said upper part and on which said cable is trained, the other end of said cable attached to the upper end of said lower fork part, said elastic tension cord biasing said lower part downwardly with respect to said upper part.

19. A bicycle comprising a steering rod rotatably received with a steering rod receiving sleeve, an upper fork part fixed to said steering rod, a lower fork part slidably guided on said upper fork part for up and down movement relative to said upper fork part, the lower end of said lower fork part adapted to carry a front bicycle wheel, an elastic tension cord connected to said two parts and biasing said lower part downwardly with respect to said upper part, and a bicycle frame including said sleeve and a rear portion, a flexible cable attached to the lower end of said upper fork part and to said rear portion, a flexible sheath surrounding said cable, attached to the upper end of said lower fork part and having its other end freely moveable on said cable and said elastic tension cord having one end attached to said frame adjacent said sleeve and its other end attached to the free end of said sheath.

* * * * *